United States Patent [19]

Perry

[11] 4,272,999

[45] Jun. 16, 1981

[54] FLUID PRESSURE OPERATED ACTUATOR

[75] Inventor: Forbes G. B. Perry, Forest Row, England

[73] Assignee: National Research Development Corporation, London, England

[21] Appl. No.: 27,595

[22] Filed: Apr. 5, 1979

[30] Foreign Application Priority Data

Apr. 11, 1978 [GB] United Kingdom ............... 14144/78

[51] Int. Cl.³ .......................... F16H 17/00; F01B 7/04
[52] U.S. Cl. ........................................ 74/200; 74/207; 92/69 R; 92/75; 92/111; 92/117 A; 92/165 PR
[58] Field of Search ...................... 74/190, 190.5, 194, 74/196, 197, 199, 200, 201, 207; 92/50, 69 R, 75, 110, 111, 117 A, 165 PR

[56] References Cited

U.S. PATENT DOCUMENTS

| 1,181,110 | 5/1916 | Carter | 92/69 R |
|---|---|---|---|
| 2,851,994 | 9/1958 | Fagge | 92/111 X |
| 3,485,141 | 12/1969 | Ott et al. | 92/111 X |
| 4,002,105 | 1/1977 | Bell et al. | 92/75 X |

FOREIGN PATENT DOCUMENTS

| 1060335 | 7/1959 | Fed. Rep. of Germany | 92/110 |
|---|---|---|---|
| 979062 | 1/1965 | United Kingdom . | |
| 1029636 | 5/1966 | United Kingdom . | |
| 1078791 | 8/1967 | United Kingdom . | |
| 1325602 | 8/1973 | United Kingdom . | |
| 1436288 | 5/1976 | United Kingdom . | |
| 1447555 | 8/1976 | United Kingdom . | |

Primary Examiner—C. J. Husar
Assistant Examiner—Moshe I. Cohen
Attorney, Agent, or Firm—Cushman, Darby & Cushman

[57] ABSTRACT

A piston-and-cylinder type actuator, for use particularly in steplessly-variable-ratio transmission units of the toroidal race rolling friction type. In such units the actuator may serve to thrust the input and output members and their intermediate rollers into engagement, so that drive will be transmitted. According to the invention enhanced thrust is obtained by interposing auxiliary pistons (6, 7) in the space between the main piston (1) and the end (4) of the cylinder (2). One of pistons 6, 7 is linked to the main piston 1 and the other to cylinder 2, and they divide the said space into two pressurized zones (16, 18) with a vented zone between them. Where the actuator has to rotate about the cylinder axis, unwanted centrifugal forces generated within zones 16, 18 may be diminished by forming the vented zone so that a quantity of fluid may accumulate in it. Centrifugal forces develop within this fluid too, and the vented and pressurized zones are put into communication in such a way that the centrifugal forces within the two zones are opposed and tend to cancel each other out.

19 Claims, 8 Drawing Figures

FLUID PRESSURE OPERATED ACTUATOR

This invention relates to a fluid pressure operated linear actuator for use in applications where only a limited overall diameter can be tolerated and where the range of linear motion required is small.

According to the invention there is provided a fluid pressure operated actuator comprising a main cylinder having a cylindrical portion and a cylinder end portion and a main piston movable axially within the cylinder and in sealing relation within the cylinder at least two auxiliary pistons received within the cylinder between the main piston and the cylinder end portion and sealed against the passage of fluid past their edges, the pair of auxiliary pistons defining, between one member of the pair and the cylinder end portion, a pressurized zone, and between the other member of the pair and the main piston, another pressurized zone and the members of the pair defining a vented zone between them, the member of the pair of auxiliary pistons nearest to the cylinder end portion being mechanically linked to the main piston and the member of the said pair nearest to the main piston being mechanically linked to the cylinder, the linkages in both cases being under compression when pressurised fluid is introduced into the pressurised zones, ducts being provided for the introduction of pressurised fluid into the pressurised zones and for venting the vented zone.

According to another of its aspects the invention comprises a rotary actuator having a piston and a cylinder capable of relative movement along the axis of rotation, means for blocking the end of the cylinder to provide an annular first chamber between the piston and the blocking means and duct means for introducing pressurised fluid into the first chamber to urge the piston and the blocking means apart, flange means attached to the cylinder for providing a vented second chamber on the side of the piston remote from the blocking means the latter chamber being vented by an escape path leading to the periphery of the actuator from a venting zone situated radially inwards of the periphery of the second chamber but further, to a predetermined extent, from the rotational axis than the distance from such axis of the point at which pressurised fluid first enters the rotating system whereby pressure in the first chamber due to centrifugal force acting on fluid in the first chamber is partly neutralized by pressure due to centrifugal force acting on fluid which accumulates in the second chamber outboard of the venting zone, means being provided for introducing fluid into the vented chamber under substantially no pressure other than that produced by centrifugal force as aforesaid.

According to another aspect of the invention there is provided a fluid pressure operated actuator comprising a main cylinder and a main piston movable in sealing relationship within the main cylinder which has a cylindrical portion and a cylinder-end portion the actuator further comprising a plurality of auxiliary pistons received in sealing relation within the cylindrical portion of the main cylinder, between the cylinder-end portion and the main piston, these auxiliary pistons defining alternately a pressurised zone and a vented zone, pressurised zones being between the cylinder-end and a first auxiliary piston and between the main piston and a second auxiliary piston with ducts for the passage of pressurised fluid to the pressurised zones and ducts for the escape of fluid from the vented zone, a number of first pillars in contact with a face of the first auxiliary piston each first pillar passing, in sealing relation, through an opening in the second auxiliary piston and bearing against the face of the main piston and a number of second pillars in contact with a face of the second auxiliary piston each second pillar passing, in sealing relation, through an opening in the first auxiliary piston and bearing against the face of the cylinder-end portion, whereby the pressure in the pressurised zones combines to force the main piston and the cylinder end apart, the first pillars being spaced apart circumferentially of the main axis of the actuator and the second pillars being similarly spaced apart, the first pillars being spaced apart from the second pillars radially of the said main axis.

Preferably a central strut is provided, fixed to the main piston, which passes in sealing relation through an opening in the second auxiliary piston and bears against a face of the first auxiliary piston. The central strut may be hollow to receive a shaft or the like, when the actuator is intended to rotate, for instance.

The cylindrical portion of the cylinder may be stepped to provide an annular face bearing against a face of the second auxiliary piston remote from the main piston.

One or more additional pairs of auxiliary pistons may be provided which are located between the first and the second auxiliary pistons, which pair defines between the members of the pair a pressurised zone and on each outer side of the pair a vented zone the first and second pillars passing in sealing relation through openings in the additional auxiliary pistons; pillars in contact with a face of a member of an additional pair nearest to the cylinder and each pass in sealing relation through an opening in the first auxiliary piston and aligned openings in any intervening pair of additional auxiliary pistons and bear against the cylinder end portion of the main cylinder and pillars in contact with a member of such additional pair nearest to the main piston each pass in sealing relation through an opening in the second auxiliary piston and aligned openings in any intervening pair of additional auxiliary pistons and bear against the main piston.

Preferably the first and second pillars are stepped to provide annular end faces bearing, in the case of the first pillars against a face of a member of a pair of additional auxiliary pistons nearest to the main piston and in the case of the second pillars against a face of a member of a pair of additional auxiliary pistons nearest to the main cylinder end thus eliminating the need for separate pillars for the additional auxiliary pistons.

The central pillar attached to the main piston has steps providing annular end faces against which bears the surface of the member of a pair of additional auxiliary pistons which surface and which member is nearest to the main piston. Also the inner surface of the cylindrical portion of the cylinder has steps each providing an annular face against which bears the surface of the member of a pair of additional auxiliary pistons which surface and which member is nearest to the cylinder end.

For the purpose of reducing the effect of centrifugal force acting on the fluid in the pressurised zones in the case of a rotating actuator, the escape passages from the vented zone or zones may be extended inwardly towards the centre of the actuator so that fluid leaking from the pressurized zones or fluid supplied to the vented zones in any other way, may accumulate in the vented zone or zones outwardly of the radially inner ends of the extended escape passages, such accumulated fluid being subject to centrifugal force which partly counteracts the effect of centrifugal force acting on the fluid in the pressurised zones.

Where it is required to reduce the said effects of centrifugal force the outlets from the vented zones may be directed inwardly and carried from the actuator via a duct or ducts on or near to the rotational axis of the actuator. Where only partial cancellation is required the outlets may be exerted inwardly from peripheral escape vents to any desired degree by means of radially inwardly extended stack pipes of selected length.

The invention will be more clearly understood from the following description of certain embodiments thereof illustrated in the accompanying drawings in which:

FIG. 6 shows an actuator incorporating another aspect of the invention.

Figures 1, 2, 3:
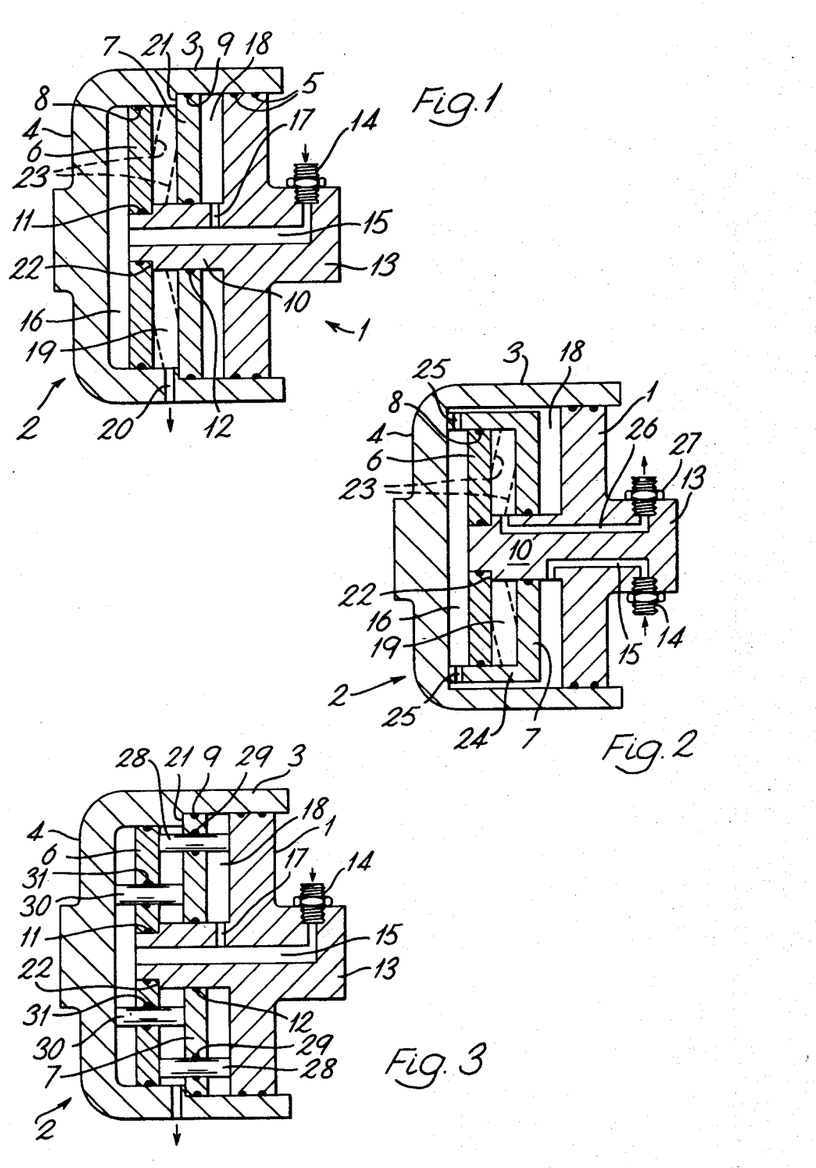
FIG. 1 shows an actuator according to the invention which is not intended to rotate.
FIG. 2 shows another non-rotary actuator according to the invention.
FIG. 3 shows yet another non-rotary actuator according to the invention.

In FIG. 1 a main piston 1 is received within a cylinder 2 which has a cylindrical portion 3 and a cylinder-end portion 4. Seals 5 are provided in the periphery of main piston 1 which seals engage the inner surface of cylindrical portion 3.

Two auxiliary pistons 6 and 7 are received within cylinder 2 between main piston 1 and cylinder end portion 4. Seals 8 and 9 are provided in the outer edges of auxiliary pistons 6 and 7 respectively which seals engage the inner surface of cylindrical portion 3.

A cylindrical boss 10 extends from the central region of main piston 1 in the direction of cylinder end portion 4 and passes through central openings in auxiliary pistons 6 and 7. Seals 11 and 12 are accommodated round the inner margins of these openings in auxiliary pistons 6 and 7, which seals engage the outer surface of boss 10.

A further cylindrical boss 13 extends from the side of main piston 1 remote from cylinder end portion 4 and a pipe union 14 on the outer cylindrical surface of boss 13 communicates, via a central drilling 15 in boss 13, main piston 1 and boss 10, with the chamber 16 between cylinder end portion 4 and auxiliary piston 6, and, via a branch-drilling 17, with the chamber 18 between main piston 1 and auxiliary piston 7.

The chamber 19 between auxiliary pistons 6 and 7 is vented via a hole 20 drilled radially through cylindrical portion 3.

The outer edge of auxiliary piston 7 bears against the face of a step 21 in the inner wall of cylindrical portion 3 and the inner edge of the central opening in auxiliary piston 6 bears against a step 22 near the end of boss 10.

When pressurised fluid is introduced into chambers 16 and 18 via pipe union 14, auxiliary piston 6 is urged by the pressure in chamber 16 away from cylinder end 4 and, bearing against step 22 on boss 10, urges main piston 1 away from cylinder end 4, and cylinder end 4 is urged away from main piston 1; likewise the pressure in chamber 18 urges auxiliary piston 7 and, bearing on step 21, cylinder 2 also, away from main piston 1 at the same time the pressure in chamber 18 urges main piston 1 away from cylinder end 4.

The pressures in chamber 16 and 18 thus act cumulatively to urge main piston 1 away from cylinder end 4 with a force substantially double that which would arise if the auxiliary pistons 6 and 7 were omitted and vent hole 20 blocked. As main piston 1 moves, in the cylinder, away from cylinder end 4, the chamber 19 becomes more narrow until, ultimately, auxiliary pistons 6 and 7 come into contact whereafter the force augmentation of the two pressurised chambers 16 and 18 ceases and any further operation of the actuator is under control of the pressure in chamber 16 only. There will be applications where use can be made of this feature in an actuator in which, after a predetermined travel, the actuator force is suddenly reduced, but for most applications the distance between auxiliary pistons 6 and 7, when the actuator is fully retracted, represents the full effective travel of the actuator. As shown in FIG. 1 the actuator could be further retracted by moving main piston 1 and auxiliary piston 6 to the left but in a practical design, measures would have to be taken to ensure that the residual width of chambers 16 and 18 was not reduced to such an extent as to interfere with the free flow of pressurised fluid into these chambers. A small extension of boss 10 beyond the left face of auxiliary piston 6 would suffice for this purpose.

The actuator shown in FIG. 1, suffers from the disadvantage that, in the presence of high actuating pressures, the auxiliary pistons will bend, if they are thin, as indicated by the dotted lines 23.

FIG. 2 shows a modified arrangement enabling seals 9 and step 21, of FIG. 1 to be dispensed with, auxiliary piston 7 being furnished with a cylindrical flange 24 which extends around auxiliary piston 6 and makes contact with cylinder end 4. Seal 8 co-operates with the inner surface of flange 24 and the outer edge of auxiliary piston 6 to secure the integrity of chamber 16. A clearance between flange 24 and cylindrical portion 3 of cylinder 2 and holes 25 in flange 24 allows fluid to flow between chamber 18 and chamber 16, chamber 19 being vented via a duct 26 running through boss 10, main piston 1 and boss 13 to a pipe union 27 and thence to drain.

As with the arrangement of FIG. 1, the auxiliary pistons 6 and 7 of FIG. 2 may bend according to dotted lines 23.

FIG. 3, in which the reference numerals of FIGS. 1 and 2 are repeated for corresponding items, shows an actuator similar to that of FIG. 1 in which the bending of the auxiliary pistons may be reduced to negligible portions.

Auxiliary piston 6 is supported at its central region by step 22 on boss 10. To provide similar support to the outer regions of auxiliary piston 6, pillars 28 are provided which pass through holes in auxiliary piston 7 and bear at their ends on the face of auxiliary piston 6 and main piston 1 respectively. Two diametrically opposite pillars 28 are shown but in practice three or more such pillars would be distributed at suitable circumferential spacing around the main axis of the actuator. Seals 29 prevent leakage from chamber 18 through the holes in auxiliary piston 7 which accommodate pillars 28.

Auxiliary piston 7 is supported at its outer periphery by the step 21 in the cylindrical portion 3 of cylinder 2.

To support the central portion of auxiliary piston 7, pillars 30 are provided, which pass through holes in auxiliary piston 6 and bear at their ends on the faces of auxiliary piston 7 and cylinder end 4 respectively. Seals 31 prevent leakage from chamber 16 through the holes in auxiliary piston 6, which accommodate pillars 30. As in the case of pillars 28, three or more pillars 30 will in practice be provided.

There will be optimum radial positions for pillars 28 and 30; for instance if pillars 28 are placed too far from the central axis of the actuator auxiliary piston 7 may bow away from main piston 1 between step 21 and pillars 28. Likewise if pillars 30 are placed too close to the central axis of the actuator, auxiliary piston 6 may bow away from cylinder end 4 between step 22 on boss 10 and pillars 30.

The embodiments described in relation to FIGS. 1, 2 and 3 are predominantly non-rotary actuators.

Figure 4:
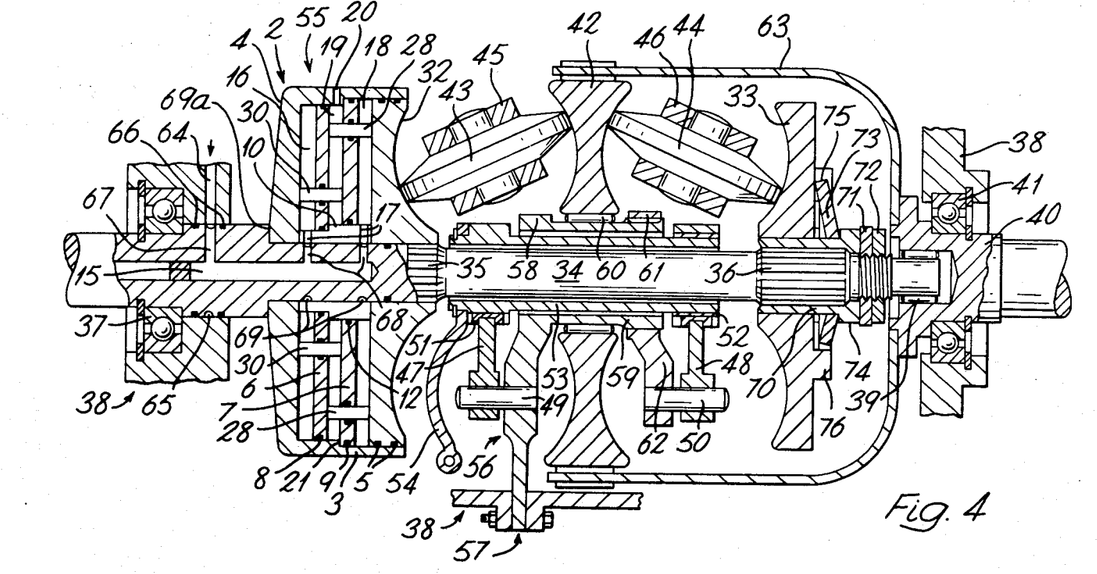
FIG. 4 shows an actuator according to the invention for use in a toroidal race rolling traction transmission unit, the actuator being required to rotate.

The invention is especially suitable however to rotary actuators and FIG. 4 illustrates the use of an actuator according to the invention, used as an "end-load" actuator in a steplessly variable ratio transmission unit of the toroidal race rolling friction type where rollers provide a driving connection between an input disc and an output disc having facing toroidal surfaces, the end-load actuator serving to force the two discs together upon and into driving engagement with the rollers.

In fact, as is well known, the inter-engaging disc and roller surfaces must always be separated by a microscopic layer of oil so that it is perhaps more appropriate to refer to this type of transmission as a "rolling traction" transmission unit.

Considerable end load force is required to avoid gross slipping of the rollers on the discs but only a very small travel of the end-load actuator is called for.

In FIG. 4, (in which the reference numerals used in FIGS. 1, 2 and 3 are again used to denote corresponding items), two toroidally surfaced input discs 32 and 33 are keyed by splines 35 and 36 respectively to a main input shaft 34, which is supported at one end by a ball bearing 37 in a casing 38 (only parts of which are shown), and at the other end by needle roller bearings 39 in an output member 40 which is in turn supported by a ball bearing 41 in another part of the casing 38.

Between discs 32 and 33 an output disc 42 is provided, which has toroidal surfaces on both sides of it. Rollers such as 43 provide a driving connection between disc 32 and one side of disc 42. Rollers such as 44 provide a driving connection between disc 33 and the other side of disc 42, these two sets of rollers, such as 43 and 44 provide parallel drive paths from input discs 32 and 33, (which revolve together because they are keyed to main shaft 34), to output disc 42.

Rollers such as 43 are supported in roller carriers such as 45 and rollers such as 44 are supported in roller carriers such as 46. Three rollers such as 43 and three rollers such as 44 are provided.

The roller carriers 45 are pivotally anchored to rocker levers such as 47 which permit the rollers to swing about ratio axes substantially tangential to the torus centre circle (being the circle about which rotates the centre of a circle which is the generator of the facing toroidal surfaces of discs 32 and 42).

The roller carriers such as 46 are pivotally anchored to rocker levers such as 48 which permit the rollers such as 44 to swing about ratio axes substantially tangential to the corresponding torus centre circle for the facing surfaces of discs 33 and 42.

The rocker levers such as 47 and 48 swing about pivot pins such as 49 and 50 which are anchored by an arrangement of spiders (to be described), to casing 38. Movement of the rocker levers about these pivot pins causes or permits the rollers to move along the lines of their ratio axes to initiate a change of ratio. The rocker levers have arms extending radially inwardly towards the axis of the transmission unit the inner ends of these arms being received in slots in common thrust-receiving members 51 for rocker levers such as 47, 52 for rocker levers such as 48, the two members 51 and 52 being secured to the ends of a control sleeve 53 which is connected to a lever 54 by which the sleeve 53 and members 51 and 52 may be rotated about the main axis of the transmission unit. The outer end of lever 54 is connected to a ratio actuator (not shown). The pins 49 are mounted in the respective legs of a three-legged spider 56 one leg only being shown, achored to the casing 38 at 57. The three spider legs are joined together at their inner ends by a ring 58 which is integral with or secured to a sleeve 59 which passes (surrounding sleeve 53 with clearance) through a central aperture in the output disc 42 and forms the inner race for a needle roller bearing 60 upon which disc 42 rotates.

At the other side of disc 42, remote from ring 58, sleeve 59 is splined to receive a ring 61 with the possibility of limited axial movement, and three spider arms such as 62 radiate outwardly from ring 61. One of the arms such as 62 is shown and supports pin 50. These spider arms, such as 62 cannot be continued outwardly and secured to case 38 because the drive from disc 42 is taken by means of a bell 63 secured to the output member 40.

Further details of the means of supporting the rollers and the mechanism of ratio change are contained in U.K. Patent Specification No. 979,062. The torque reaction at the roller mountings acts on trust receiving members 51 and 52 tending to rotate sleeve 53 and this is resisted by the ratio actuator coupled to the end of lever 54. The roller torque reaction tends to be in balance with the actuator force acting on lever 54 because if these forces fall out of balance, the rollers shift tangentially causing a change of ratio which restores the balance. The ratio actuator force is therefore a measure of the roller torque reaction.

Ratio is controlled by varying the fluid pressure applied to the ratio actuator by means of a control circuit. Subject to the reservation hereafter explained the end load force should always be proportional to the roller torque reaction and the fluid pressure, determined by the said control circuit, which is applied to the ratio actuator is preferably also applied to the end load actuator. However this can involve the use of inconveniently high fluid pressures in the ratio control circuit leading to high pumping losses.

The invention enables this disadvantage to be reduced as, with the two fold force-multiplication end load actuator, generally indicated at 55 in FIG. 4, the actuator pressures can be halved, thus significantly reducing the losses in the ratio control circuit when the same pressure is used for both end-load and ratio actuators.

End-load actuator 55 closely resembles the actuator shown in FIG. 3, the same reference numerals again being used for corresponding items. It is necessary only, therefore, to describe the features of the FIG. 4 actuator which differ from FIG. 3.

The input disc 32 performs the role of main piston 1, and the boss 10, which may be integral with disc 32 (but need not be) is hollow and is threaded over input shaft 34. The fluid supply duct 15 enters input shaft 34 at the left hand end (as seen in the drawing). Fluid enters through a drilling 64 in casing 38 (leading from a pump, not shown) and enters a groove 65, running around input shaft 34 and flanked by seals 66. A radial drilling 67 runs from groove 65 to duct 15. Two radial holes 68 lead from duct 15 to circumferential grooves 69 running around shaft 34 within boss 10 and these grooves in turn communicate with holes 17, in boss 10, leading to chambers 16 and 18.

Cylinder end 4 is anchored against leftward movement along input shaft 34 by a shoulder 69a. When pressurised fluid is applied via duct 15 to chambers 16 and 18, auxiliary piston 7 is anchored to input shaft 34 via step 21, pillars 30, cylinder end 4 and shoulder 69a, so pressure in chamber 18 urges disc 32 to the right. Pressure in chamber 16, urges auxiliary piston 6 and cylinder end 4 apart and as the latter is anchored to input shaft 34 by shoulder 69a auxiliary piston 6, acting through step 22 on boss 10 and through pillars 28, also urges disc 32 to the right.

Disc 33 is secured to input shaft 34 by means of a collar 70 secured against rotation on shaft 34 by splines 36 and lock-nuts 71 and 72. A Belville washer 73 has a central hole with two straight sides forming chords of the circle to which the rest of the hole is shaped. These flat sides engage flats on the outer surface of collar 70 to prevent rotation of washer 73 on collar 70. A flange 74 on collar 70 prevents rightward movement of washer 73 along collar 70. Belville washer 73 has three or more circumferentially spaced tongues 75 extending from its outer margin and these tongues enter gaps in a circular ridge 76 protuding from the right hand face of disc 33, which is thus secured against rotation on input shaft 34.

Nuts 71 and 72 are tightened till Belville washer applies a predetermined preload drawing discs 32 and 33 together trapping between them rollers 43, disc 42 and rollers 44 establishing a driving connection from discs 32 and 33 to disc 42 via the rollers such as 43 and 44. The predetermined preload is sufficient to prevent slipping of the rollers on the discs under light running conditions, when actuator 55 is not pressurised. The preload is conveyed to disc 32 via input shaft 34, shoulder 69a and the left hand end of boss 10 which bears against the right hand face of cylinder end 4 when actuator 55 is not pressurised.

The clearance between disc 33 and washer 73 is exaggerated in FIG. 4, to simplify the drawing. In practice disc 33 bears against the inner margin of washers 73 and thus against flange 74 of collar 70 after a very small amount of movement, when actuator 55 is pressurised.

When actuator 55 is pressurised the whole disc and roller assembly moves a small amount to the right and to accommodate this, rocker levers 47 and 48 have a small amount of end play on their pivot pin 49 and 50 which are fixed relative to the casing by spider 56. This play also accommodates the small amount of axial compression of the disc and roller assembly when actuator 55 is pressurised.

To obtain the same end-load force from a simple actuator, that is to say without the auxiliary pistons 6 and 7, in the transmission unit illustrated in FIG. 4, without raising the fluid pressure, would necessitate an increase of the piston diameter by a factor of $\sqrt{2}$ which would be unacceptably wide in many applications, especially a vehicle transmission; furthermore the piston and cylinder would have to be massive to resist bending.

Figure 5:
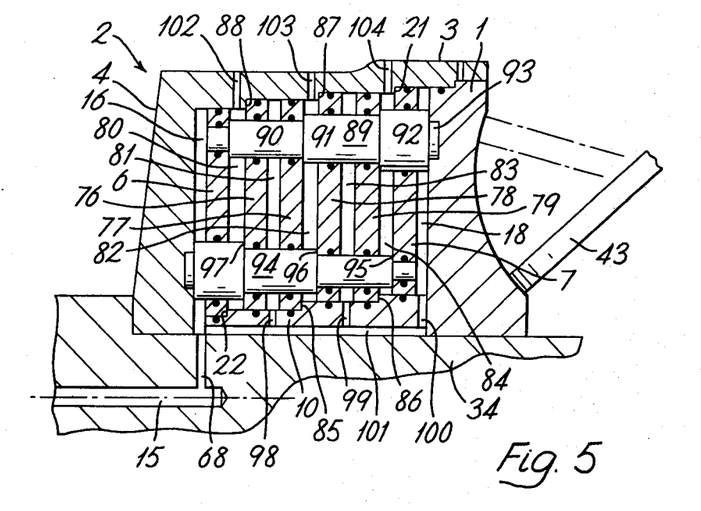
FIG. 5 shows a modified form of the actuator illustrated in FIG. 4.

It is possible still further to augment the force of the actuator, for a given diameter and a given fluid pressure, by introducing one or more additional pairs of auxiliary pistons between auxiliary pistons 6 and 7, each such pair adding an effective piston area substantially equal to that of the main piston. FIG. 5 shows an arrangement having two such additional pairs of auxiliary pistons giving a fourfold multiplication of the actuator force as compared with a simple actuator having no auxiliary pistons.

In FIG. 5 the same reference numerals as are used in the preceding Figures are again used for corresponding items. This actuator is shown as applied to a toroidal race transmission unit of the type illustrated in FIG. 4 though FIG. 5 itself only shows the end load actuator above the main axis of input shaft and its immediate surroundings.

It is convenient to regard the two auxiliary pistons 6 and 7 of the previous Figures as being separated and the additional two pairs of auxiliary pistons 76/77 and 78/79 as being inserted between them. The seven chambers defined by the cylinder end 4, the main piston 1 and the six auxiliary pistons, 6, 76, 77, 78, 79, 7 consist of alternate pressurised and vented chambers, 16 (pressurized), 80 (vented), 81 (pressurised), 82 (vented), 83 (pressurised), 84 (vented) and 18 (pressurised).

Boss 10 now has three steps 22, 85 and 86, whilst cylindrical portion 3 has three steps 21, 87 and 88. The central openings in auxiliary pistons 6, 77 and 79 bear respectively against steps 22, 85 and 86 of boss 10, whilst the outer margins of auxiliary pistons 7, 78 and 76 bear respectively against steps 21, 87 and 88 of cylindrical portion 3.

It would be possible to use independent pillars such as 28 and 30 for each of the auxiliary pistons. For instance, the pillar 28 would be as in FIGS. 3 and 4 but a pillar from the right hand face of auxiliary piston 77 would have to pass through holes (with seals) in auxiliary pistons 78, 79 and 7 to make contact with main piston 1; furthermore a pillar from the right hand face of auxiliary piston 6 would have to pass through holes (with seals) in auxiliary pistons 76, 77, 78, 79 and 7, to make contact with main piston 1. Similar triplication in respect of pillar 30 would be required. As at least three sets of six pillars would be required, circumferentially distributed around the actuator this would involve a large number of seals and, particularly as the longer pillars would have to be made thicker to avoid buckling, an unacceptably large amount of the piston area would be rendered ineffective.

A preferable arrangement is to replace pillar 28 and the two corresponding extra pillars, by a single stepped pillar 89, having four different diameters along its length starting with the smallest diameter within auxiliary piston 6, increasing to form a step 90 against which the right hand face of auxiliary piston 6 bears. This second diameter continues through holes (with seals) in auxiliary pistons 76 and 77, increasing again to form a shoulder 91 against which the right hand face of auxiliary piston 77 bears. This second increased diameter continues through holes (with seals) in auxiliary pistons 78 and 79, the diameter of the pillar then increasing again to form a shoulder 92 against which the right hand face of auxiliary piston 79 bears. This finally increased diameter extends through a hole (with a seal) in auxiliary piston 7, the end of pillar 89 then making contact with the left hand face of main piston 1. A protrusion 93 from the right hand end of pillar 89 is received in a shallow cavity in the left hand face of main piston 1, which stabilises the assembly. It will be seen that the steps on pillar 89 correspond to and are aligned with the steps on boss 10.

Similarly pillar 30 and the two additional pillars previously referred to are replaced by a pillar 94, similar to pillar 89 but the reverse way round with the ticker end bearing against cylinder end 3 and the thinner end received in a hole in auxiliary piston 7. The three steps on pillar 94 act against the left hand faces of auxiliary pistons 7, 78 and 76. The steps 95, 96 and 97 on pillar 94 correspond to and are aligned with the steps 88, 87 and 21 on cylindrical part 3.

There are thus four pressurised chambers 16, 81, 83 and 18 which contribute to the fourfold multiplication of the actuator force.

Pressurised fluid enters chambers 16, 81, 83 and 18 via duct 15 running axially along the centre of input shaft 34, then radially outwards through duct 68 into chamber 16 and via an inner axial groove 101 in boss 10 and radial ducts 98, 99 and 100 leading therefrom into chambers 81, 83 and 18 respectively.

The intervening vented chambers 80, 82 and 84 are drained through radial holes 102, 103 and 104 in cylindrical portion 3 of cylinder 2.

Only one quarter of the pressure that would be required in the case of a simple actuator without auxiliary pistons can produce the required end load. This can however give rise to a difficulty because of the effect of centrifugal force acting on the fluid in the pressurised chambers which augments the actuator force to an increasing extent with rising speed. Reduction of the pressurisation pressures, made possible by the introduction of the auxiliary pistons enhances the speed dependence of the actuator due to centrifugal force. A certain amount of speed dependence of the actuator force is beneficial in the case of a rolling "traction" transmission unit because the effective coefficient of "traction" between the rollers and the discs is lowered with rising rolling speeds, necessitating higher end load forces than are predicted by the general rule that end load force must be proportional to roller torque reaction.

Figures 6, 8:
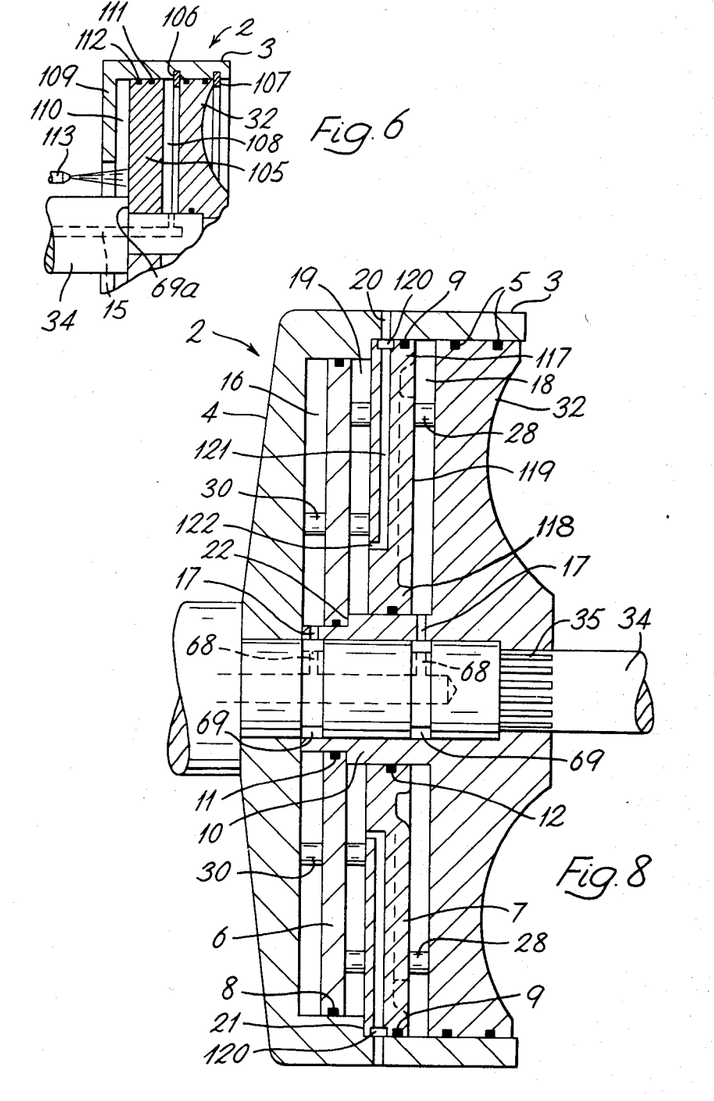

FIG. 6 illustrates a method of use in a simple actuator, for reducing the effect of centrifugal force acting on the fluid in the pressurised chamber of the actuator to a chosen extent so as to avoid excessive speed dependence of the actuator force but at the same time to leave some of the speed dependence to counteract the fall in effective coefficient of traction with rising roller speeds.

FIG. 6 shows an end-load actuator for a toroidal race transmission unit of the type illustrated in FIG. 4 and the reference numerals of FIG. 4 are again used for corresponding items in FIG. 6. As in the case of FIG. 5 only the top half of the actuator is shown. The disc 32 serves, in effect, as the cylinder end 4 and a piston 105, situated to the left of disc 32 bears against shoulder 69a on input shaft 34. The cylindrical portion 3 of cylinder 2 surrounds disc 32 and piston 105, being anchored to the former by two circlips 106 and 107. Disc 32, cylindrical portion 3 and piston 105 define between them a chamber 108 to which pressurised fluid may be supplied via duct 15. Cylindrical portion 3 extends to the left beyond piston 105 and has an integral annular flange 109 which extends radially inwards towards input shaft 34 but its inner edge is radially outward from the inner margin of chamber 108. Flange 109 is spaced axially from piston 105 to provide a vented cavity 110 on the opposite side of piston 105 from chamber 108. Fluid is introduced into cavity 110 either by leakage past seals 111 and 112 which may take the form of gapped piston rings to facilitate this. Alternatively a jet of fluid may be projected at the face of piston 105 within the inner margin of flange 109 through a nozzle 113 supplied from the lubrication circuit of the transmission unit. Centrifugal force acting on the fluid in cavity 110 produces a force tending to draw cylinder 2 and disc 32 to the left in opposition to the force due to the pressure in chamber 108 tending to force cylinder 2 and disc 32 to the right. The latter pressure is due partly to centrifugal force acting on the fluid in chamber 108 and this centrifugal component is partially cancelled by the pressure due to centrifugal force acting on the fluid in cavity 110, the extent of the cancellation being governed by the extent of the radially inward extension of flange 109 since this determines the centrifugal head of fluid in cavity 110, any excess fluid escaping round the inner margin of flange 109.

The effective centrifugal head of fluid in the pressurised chamber 108 is not solely determined by the inner margin of the actual chamber. There is a continuous column of fluid in the ducts leading to the pressurised chamber 108 and were the pressurised fluid to be introduced through a tube fixed to the casing of the transmission unit and entering duct 15 along the line of the rotational axis of the rotating system then the radial distance from the rotational axis of the rotating system to the outer margin of chamber 108, would be a measure of the centrifugal head supplementing the pressure in chamber 108. If on the other hand the pressurised fluid is introduced into the rotating system at a point on the outer surface of input shaft 34, as in the case of the FIG. 4 arragement, then pressurised fluid entering the rotating system from the fixed duct 64 encounters a pressure resistance due to centrifugal force, proportional to the square of the radial distance d from the rotational axis of shaft 34 to the groove 65. When the fluid reaches the ducts 68 however centrifugal force starts to augment the externally supplied pressure and when a distance from the rotational axis equal to d has been reached then the initial opposing centrifugal head (in duct 67) will have been overcome and the pressure will again be equal to the externally applied pressure and the effective centrifugal head augmenting the pressure in chamber 108 of FIG. 6 will extend from a point a distance d from the rotational axis, to the outer margin of chamber 108. In these circumstances the radial distance from the rotational axis to the inner margin of flange 109 must exceed distance d by an amount necessary to cancel the effect of centrifugal force in chamber 108 to the desired extent.

When the pressurised fluid enters the rotating system through a fixed tube aligned with the rotational axis and, for instance, entering duct 15 in sealing relation, then distance d is equal to zero.

This expedient lends itself particularly well to rotary actuators such as those illustrated in FIGS. 4 and 5 since they already possess one or more vented chambers in which fluid can be allowed to accumulate by shifting the inlets to the escape passages, such as 20 (FIG. 4) and 102, 103 and 104 (FIG. 5) to a point or points inboard of the radially outer margin of each vented chamber.

Figure 7:
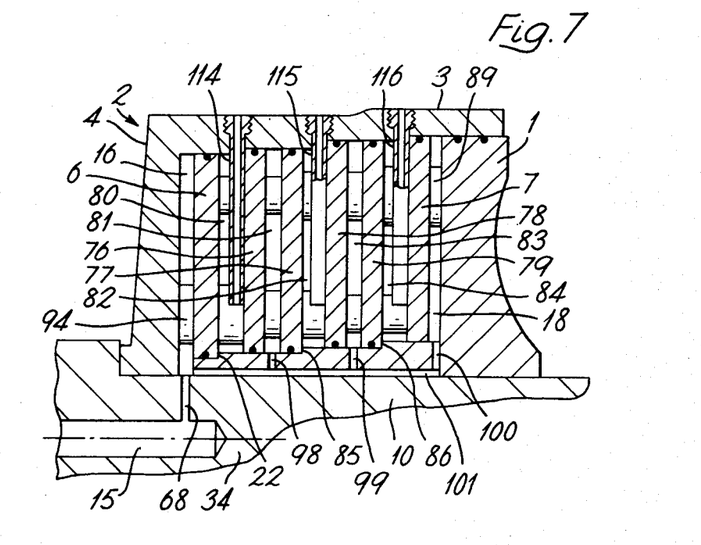
FIG. 7 shows a further modification of the actuator illustrated in FIG. 4 incorporating the aspect of the invention illustrated in FIG. 6, and, FIG. 8 shows a further modification of the actuator illustrated in FIG. 4, incorporating the aspect of the invention illustrated in FIG. 6.

The need for partial cancellation of the effects of centrifugal force acting on the fluid in the pressurised chambers is greater the higher the multiplication of actuator force obtained by the introduction of auxiliary pistons, when advantage of such force multiplication is taken to enable the scale of operating pressures to be reduced since then the pressure component due to centrifugal force, which is dependent only on rotational speed (for a given size of actuator), forms a larger proportion of the externally applied end-load control pressure. FIG. 7 shows how the vented chambers could be used to control the effect of centrifugal force on the actuator force, in an actuator of the type shown in FIG. 5. The same reference numerals as those used in FIG. 5 are again used in FIG. 7 to denote corresponding items. The section taken in FIG. 7 does not intersect the axes of the pillars such as 89 and 94. The only difference from the arrangement illustrated in FIG. 5 concerns the method of venting the vented chambers 80, 82 and 84 and the description of FIG. 7 will be confined to this venting method.

Instead of venting these chambers 80, 82 and 84 by means of holes 102, 103 and 104 drilled through the wall of cylindrical portion 3, three tubes 114, 115 and 116, threaded into the wall of cylindrical portion 3, penetrate radially inwards into chambers 80, 82 and 84 respectively stopping short of the radially innermost margins of the chambers by an amount determined by calculation and/or trial and error to give the desired amount of centrifugal cancellation and leaving the desired amount of speed dependence of the actuator force. Three tubes such as 114, 115 and 116, should preferably be provided in each of the vented chambers 80, 82 and 84 to minimise the risk of air locks arising from entry of air into the vented chambers when they are not rotating.

Fluid will leak from the adjoining pressurised chambers via the seals at the peripheries of the auxiliary pistons, selected seals being of the gapped piston ring type to ensure adequate flow of fluid into the vented chabers. When the actuator is rotating, fluid in the vented chambers will be flung outwards but can only escape through the inner ends of tubes 114, 115 and 116. Fluid will therefore remain in the chambers outboard of the inner ends of the tubes and the space inboard of the ends of the tubes will be emptied of fluid.

FIG. 8 shows an arrangement similar to that of FIG. 7, applied to an actuator giving two-fold force magnification, similar to the actuator of FIG. 4. The same numerals as are used in FIG. 4 are used in FIG. 8 to denote corresponding items. Since resort may be had to the description of FIG. 4 for a large part of FIG. 8 it is only necessary at this point to describe the departures from the FIG. 4 arrangement.

Auxiliary piston 7 has a thickened rim 117 at its outer periphery and (118) at the central opening where it abuts boss 10. It also has a thickened portion (119) forming a radial rib on the right hand side in two diametrically opposite locations away from the holes through which the pillars such as 28 pass. A groove 120 is cut around the periphery of auxiliary piston 7 which registers with the vent hole 20 passing through cylindrical portion 3 of cylinder 2. The seal 9 rests in another groove to the right of groove 120.

A hole 121 is drilled from the floor of groove 120 radially inwardly through the body of auxiliary piston 7 for a distance chosen to provide a desired degree of centrifugal force cancellation, where it is joined by a hole 122 leading into vented chamber 19.

It is preferable not to make provision for preventing relative rotation between the auxiliary pistons, the cylinder and the main piston. Therefore the pillars such as 30 must have an annular zone on the left hand face of auxiliary piston 7 reserved for them to bear against in any arbitrary circumferential position. Hole 122 must not lie on this reserved zone or it may be obscured. This may involve a compromise between the ideal location of pillar 30 and the ideal location of hole 122, but no great departure from these ideal positions should be necessary.

I claim:

1. A fluid pressure operated actuator comprising a cylinder having a cylindrical portion and a cylinder end portion and a main piston movable axially, in sealing relation, within the cylinder characterized by the following features in combination:
    (a) a pair of auxiliary piston members received within said cylinder between said main piston and the cylinder end portion,
    (b) sealing means permitting limited passage of fluid past the edges of the auxiliary piston members,
    (c) a pressurized zone between a first member of said pair of auxiliary piston members and the cylinder end portion,
    (d) another pressurized zone between a second member of the pair of auxiliary piston members and said main piston,
    (e) a vented zone between the members of the pair of auxiliary piston members,
    (f) mechanical linkage means coupling, to the main piston, the member of the pair of auxiliary piston members which is nearest to the cylinder end portion,
    (g) mechanical linkage means coupling to the cylinder end portion, the member of the pair of auxiliary pistons which is nearest to the main piston,
    (h) duct means for the introduction of pressurized fluid into the pressurized zones of paragraphs (c) and (d), above,
    (i) an escape orifice through which fluid, accumulating in said vented zone, may escape.

2. An actuator as claimed in claim 1 characterised by a step formed in the inner wall of the cylindrical portion of the cylinder providing an annular face against which bears the outer periphery of the face of the member of a pair of auxiliary piston members which is nearest to the main piston, to provide at least part of the mechanical linkage named in paragraph "(g)" of claim 1.

3. The apparatus as claimed in claim 1 further including said cylindrical portion having end walls one on each side of the main piston defining, on one side of the main piston, a pressurised zone and on the other side of the main piston a vented zone, a fluid supply passage for the supply of pressurised fluid to the pressurised zone and an escape orifice with an operative edge displaced radially inwards from the inner wall of the cylindrical portion of the cylinder allowing fluid to accumulate in the vented zone radially outwards of the operative edge of the escape orifice, bearings for the cylinder defining a rotational axis coaxial with the cylindrical portion of the cylinder, rotary seals associated with at least one of such bearings, a stationary fluid supply duct communicating via such seals with the said fluid supply passage, the distance from the said axis, of the operative edge of the escape orifice from the vented zone, at one location at least along such edge, being not less than the distance from the said axis of the point at which the said stationary duct communicates with the said fluid supply passage.

4. A toroidal race rolling traction transmission unit having at least one set of rollers providing a transmission path between coaxial toroidally-faced input and output discs with means for forcing the discs into driving engagement with the rollers such means comprising an actuator as claimed in claim 3 of which the distance from the said axis of the said edge at the said location exceeds the distance from the axis of the point at which the said stationary duct communicates with the said fluid supply passage.

5. An actuator as claimed in claim 1 characterized by the following further features in combination:
(a) a number of first pillars each in contact at its ends with a face of the first auxiliary piston member and of the main piston, respectively,
(b) holes in the second auxiliary piston member through each of which one of the first pillars passes in sealing relation,
(c) a number of second pillars each in contact at its ends with a face of the second auxiliary piston member and the cylinder end portion, respectively,
(d) holes in the first auxiliary piston member through each of which one of the second pillars passes in sealing relation,
(e) said first pillars forming at least part of the mechanical linkage means named in paragraph (f) of claim 1,
(f) said second pillars forming at least part of the mechanical linkage means named in paragraph (g) of claim 1.

6. An actuator as claimed in claim 1 characterized by a central boss in contact with the main piston, an opening in the auxiliary piston nearest to the main piston, through which the boss passes in sealing relation, the boss, at its end remote from the main piston, bearing against the auxiliary piston nearest to the cylinder end portion, to provide at least part of the mechanical linkage named in paragraph "(f)" of claim 1.

7. An actuator as claimed in claim 4, adapted for use as a rotary actuator, characterized in that the boss is hollow to receive a shaft or the like.

8. An actuator as claimed in claims 6, 7 or 5 in combination, characterized in that the first pillars and the second pillars are, in each case, spaced apart circumferentially of the axis of the cylindrical portion of the cylinder and the first pillars are nearer to the wall of the said cylindrical portion than are the second pillars.

9. An actuator as claimed in claim 1 characterized by the following further features in combination:
(p) One or more pairs of additional auxiliary pistons are located between the first auxiliary piston and the second auxiliary piston,
(q) Each pair of additional auxiliary pistons defines, between the members of the pair, a pressurised zone,
(r) The outside face of each member of a pair of additional auxiliary pistons forms one boundary of a vented zone,
(s) Mechanical linkage means coupling, to the main piston, the member of a pair of additional auxiliary pistons which is nearest to the cylinder end portion,
(t) Mechanical linkage means coupling, to the cylinder, the member of a pair of additional auxiliary pistons which is nearest to the main piston.

10. An actuator as claimed in claim 9 characterized by a step formed in the inner wall of the cylindrical portion of the cylinder providing an annular face against which bears the outer periphery of the face of the member of a pair of additional auxiliary pistons which face and which member is nearest to the cylinder end portion.

11. An actuator as claimed in claim 9 characterized by a central boss attached to or in contact with the main piston at one end and with the first auxiliary piston at the other end, with openings in the second auxiliary piston and any intervening additional auxiliary pistons, the boss being stepped to provide an annular face against which bears the face of the member of a pair of additional auxiliary pistons which face and which member is nearest to the main piston.

12. An actuator as claimed in claim 9 in combination with claim 5 characterized by the following further features in combination:
(u) The first and second pillars named in paragraphs "(a)" and "(b)" of claim 5 pass in sealing relation through aligned holes in any additional auxiliary pistons between the ends of the pillars,
(v) Pillars, the ends of each of which make contact respectively with the member of a pair of additional auxiliary pistons which is nearest to the main piston, and the main piston itself, pass in sealing relation through aligned holes in the second auxiliary piston and in any intervening additional auxiliary pistons,
(w) Pillars, the ends of which make contact respectively with the member of a pair of additional auxiliary pistons which is nearest to the cylinder end portion, and the cylinder end portion itself, pass in sealing relation through aliigned holes in the first auxiliary piston and in any intervening additional auxiliary pistons.

13. An actuator as claimed in claim 12 characterised in that the first and second pillars are stepped to provide annular faces bearing, in the case of the first pillars, against a face of a member of a pair of additional auxiliary pistons nearest to the main piston and in the case of the second pillars against a face of a member of a pair of additional auxiliary pistons nearest to the cylinder end portion whereby the first and second pillars perform the functions of the pillars named in paragraphs "(v)" and "(w)" of claim 9 without the need for additional pillars to perform such functions.

14. An actuator as claimed in claim 1, adapted for use as a rotary actuator in that it is mounted on a central shaft carried in bearings defining the axis of rotation and with means for introducing pressurised fluid into fluid supply passages in the shaft and/or items rotating with the shaft which passages lead to the pressurised zones characterised by the following features in combination:
(x) The vented zone has one or more escape orifices and no other outlets,
(y) Any such escape orifice is displaced radially inwards from the outer periphery of the vented zone,
(z) Means are provided for admitting fluid into the vented zone under substantially no pressure other than that arising from centrifugal force acting on fluid so admitted, whereby fluid may accumulate in the vented zone radially outwards of the escape orifice, such fluid being subject to contrifugal force, which counteracts the effect of centrifugal force acting on fluid in the pressurised zones to a degree dependent on the distance of the escape orifice from the said axis, or where there are more than one orifices for a given vented zone and their distances from the axis differ, the largest of such distances.

15. An actuator as claimed in claim 14, in which the said distance is zero.

16. An actuator as claimed in claim 14 in which each escape orifice, in a given vented zone, comprises a pipe passing in sealing relation through a hole in the cylindrical portion of the cylinder and extending radially inwards within the vented zone, the radially inner end of such pipe being open and constituting the actual escape orifice and the radially outer end of such pipe also being open and providing a path to the exterior of the cylinder.

17. An actuator as claimed in claim 14 in which each escape orifice, from a given vented zone, comprises a hole in the face of one of the auxiliary pistons which face forms a boundary of the vented zone, a passage communicating with such hole and passing radially outwards within the said auxiliary piston to and communicating with an escape hole passing through the cylindrical portion to the exterior thereof, and with sealing means isolating the outer end of the said passage and the said escape hole from the vented zone.

18. An actuator as claimed in claim 14 in which the fluid pressure introduction means surrounds the shaft and/or the said items and is arranged so that pressurised fluid passes from a non-rotating member to a rotating member at a location radially displaced from the said axis characterised in that at least one escape orifice from the vented zone is not nearer to the said axis than is the said location.

19. A toroidal race rolling traction transmission unit having at least one set of rollers providing a transmission path between coaxial toroidally-faced input and output discs with means for forcing the discs into driving engagement with the rollers, such means comprising an actuator as claimed in claim 18, in which the said one escape orifice is further from the said axis than is the said location where pressurised fluid passes from a non-rotating member to a rotating member.

* * * * *

UNITED STATES PATENT AND TRADEMARK OFFICE
CERTIFICATE OF CORRECTION

PATENT NO. : 4,272,999
DATED : June 16, 1981
INVENTOR(S) : Forbes George DeBrie Perry It is certified that error appears in the above—identified patent and that said Letters Patent is hereby corrected as shown below:

In claim 7, line 1, delete "4" and insert --6--.

In claim 12, line 40 of column 14, change "aliigned" to --aligned--.

In claim 13, line 52 of column 14, change "9" to --12--.

*Signed and Sealed this*

*Twenty-seventh* Day of *October 1981*

[SEAL]

*Attest:*

*Attesting Officer*

GERALD J. MOSSINGHOFF
*Commissioner of Patents and Trademarks*